United States Patent [19]

Lazzari

[11] 4,287,544

[45] Sep. 1, 1981

[54] MAGNETIC DATA CARRIER FOR PERPENDICULAR RECORDING

[75] Inventor: Jean-Pierre Lazzari, Montfort-l'Amaury, France

[73] Assignee: Compagnie Internationale pour l'Informatique CII-Honeywell Bull (Societe Anonyme), Paris, France

[21] Appl. No.: 10

[22] Filed: Jan. 2, 1979

[30] Foreign Application Priority Data

Jun. 13, 1978 [FR] France .................. 78 17641

[51] Int. Cl.$^3$ .............................................. G11B 5/68
[52] U.S. Cl. ................................................ 360/131
[58] Field of Search ............ 360/131, 134, 135, 56–57; 428/900, 212; 148/105; 252/62.55, 62.51

[56] References Cited

U.S. PATENT DOCUMENTS

| | | | |
|---|---|---|---|
| 3,052,567 | 9/1962 | Gabor et al. ............... | 360/131 X |
| 3,185,775 | 5/1965 | Camras ...................... | 360/131 |
| 3,878,367 | 4/1975 | Fayling et al. ............ | 360/131 |
| 4,075,384 | 2/1978 | Suzuki et al. ............. | 360/131 X |

FOREIGN PATENT DOCUMENTS

2545959 4/1976 Fed. Rep. of Germany .

OTHER PUBLICATIONS

IBM/TDB, vol. 9, No. 2, Jul. 1966, p. 184, "Recording Medium", by Bale et al.
Applied Physics Letters, Feb. 1, 1966, vol. 8, No. 3, pp. 73–74, "Coercive Force of Thin Magnetic Films ***", by Sugita et al.
IEEE Transaction on Magnetics, vol. MAG–13, No. 5, Sep. 1977, pp. 1272–1277, "An Analysis for the Magnetization Mode for High Density Magnetic Recording" by Iwasaki et al.

Primary Examiner—John H. Wolff
Attorney, Agent, or Firm—Kerkam, Stowell, Kondracki & Clarke

[57] ABSTRACT

A carrier for magnetic data recorded therein by perpendicular recording comprises a non-magnetic substrate having at least one substantially plane surface provided with a magnetic data layer of an anisotropic magnetic material having its axis of easy magnetization perpendicular to the said plane surface, and includes an additional layer of an anisotropic magnetic material whose axis of hard magnetization is parallel to the said plane surface. An intermediate non-magnetic, insulative coupling layer may be provided to maximize magneto-static coupling between the layers while minimizing energy exchanges therebetween. A further non-magnetic sublayer may be provided directly on the plane surface of the substrate to assure good adhesion of the additional layer to the substrate and isolation thereof from the magnetic layer.

19 Claims, 4 Drawing Figures

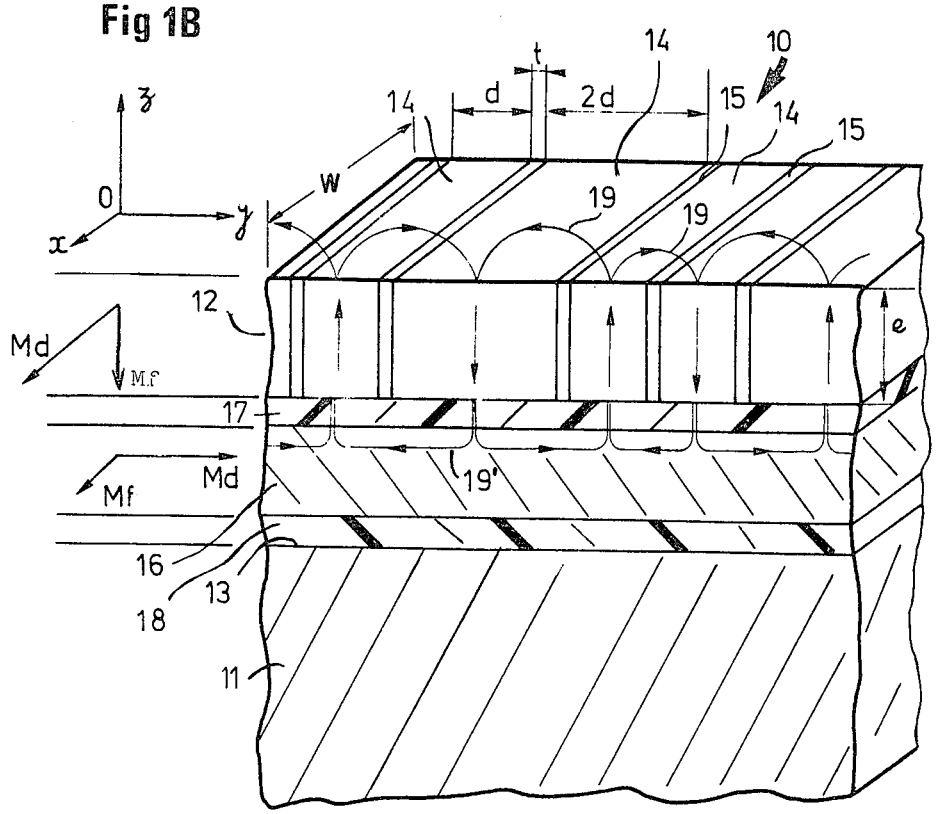
Fig 1A
Fig 1B
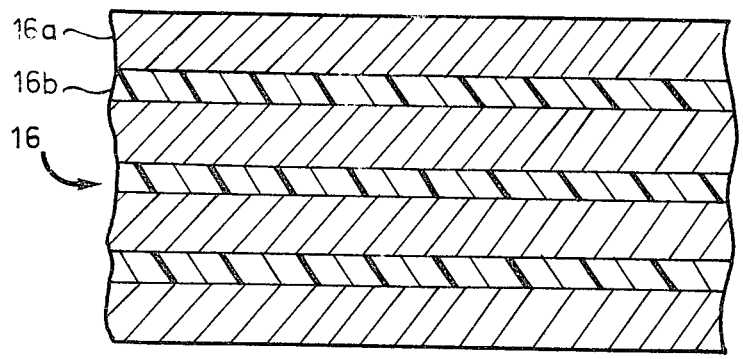
Fig 3

MAGNETIC DATA CARRIER FOR PERPENDICULAR RECORDING

BACKGROUND OF THE INVENTION

1. Field of the Invention

The invention relates to a carrier for magnetic data formed by perpendicular recording.

2. Description of the Prior Art

To record magnetic data on a track of a data carrier, there are three uniaxial methods of recording. These methods are identified by respective ones of the three dimensions of the track. In longitudinal recording, the magnetic fields representing the data (termed magnetic data fields) extend in the lengthwise direction of the track. In transverse recording the fields are perpendicular to the lengthwise direction of the track in the plane of the carrier. In perpendicular recording, the magnetic fields are perpendicular to the track and to the plane of the carrier. There is also a fourth, circular method of recording magnetic data. The circular recording method is characterized by closed circular fields in the longitudinal plane normal to the plane of the carrier.

The most widely used form of data carrier is magnetic tape, but increasing use is being made of magnetic discs, especially in data processing.

Magnetic recording, in the perpendicular mode on strips of paper, began in about the year 1920. However, it was soon superseded by longitudinal recording in view of the ease with which the latter could be performed, its reliability, and the simplicity of the equipment involved in the reading and writing of data. Longitudinal recording has found wide acceptance. Transverse recording is more difficult to put into practice and therefore has only a few very special applications. Circular recording is not used industrially.

To give a better idea of the actual advantages and disadvantages of the three main methods of recording magnetic data, the following description will relate to the recording of digital data as an example. Items of data of this kind are each contained in successive regions of a track termed "cells". To conform to the laws of magnetism, the neighboring fields of successive cells are directed in opposite directions, no matter what the method of recording. Zones termed "transitions" thus exist between the cells. These transitions are of course the site of considerable magnetic variations which produce strong demagnetizing fields. The different values of the items of digital data are usually represented either by cells of different lengths or by the magnetic complexity of the cells, as is the case with the Aiken code for example, also termed the "dual frequency code", in which an item of 0 data is represented by a cell having only a single magnetism and an item of 1 data by a cell consisting of two half-cells having opposite fields.

In the following description, d will indicate the length of a cell, e will represent the thickness and w the width of a cell and t will denote the length of a transition.

In longitudinal recording, the length t of each transition is related, by complex functions, to the magnetic properties and thickness e of the layer which forms the track, and to the spatial distribution, in the layer, of the field produced by the head. It follows from this that the transitions t may be of greater or lesser extent relative to the length d of the cells. Merely from the point of view of the space occupied, the said extent prevents recording with a high data density. However, when the length t of the transition is equal to or exceeds the length d of a cell, the magnetic layer is substantially demagnetized, and as a result the leakage flux becomes very low and inadequate to enable data to be detected and decoded. It should be added that the track, when seen through the electron microscope, has transitions t which are not straight, but of a sawtooth configuration, which to all intents and purposes increases their size still further in relation to the effective length d of the cells. The longitudinal method of recording is not suitable for obtaining the higher data densities required in particular for data processing, and effort has therefore been concentrated on the other two methods.

The advantage of transverse recording derives from the fact that the length t of the transitions is extremely small since it typically forms walls of the Neel type familiar in magnetism, given the relatively low order of magnitude of the thickness e of the track. Unfortunately, attendant on this fact, which is favorable to high recording densities, is the need to use on the one hand tracks of a soft, anisotropic magnetic material to obtain an anti-parallel orientation of the cells and to assist in writing, and on the other hand heads of complicated structure which generate a weak writing field. The writing and preservation of data are thus very much affected by external interference fields and so represent operations which are difficult to perform (see for example U.S. Pat. No. 3,611,417).

Perpendicular recording likewise has the advantage of creating narrow transitions, of which the characteristics should theoretically approximate to those of Bloch walls, but have as yet been little explored experimentally. It is all the more effective the higher the recording density. In effect, the shorter are the cells, the stronger the coupling between cells. However, the uncompensated demagnetizing fields $H_d$ which appear at the surfaces of the tracks conform to the formula $H_d = Md/e$, where M is the magnetization vector and d and e are the length and thickness of a cell. This formula demonstrates that perpendicular recording is all the more favorable when d is low and e is high. However, the thickness of the track cannot be increased as desired since this would produce an undesirable increase in the divergence of the write fields and would thus reduce the definition of the cells which, given their small length d, becomes an important factor which must be respected. Otherwise, the way in which this method can be implemented is already familiar for recording on tape but it is not yet known for recording on magnetic discs.

The distinction between tapes and discs which makes it difficult to employ the perpendicular method is due to the difference which generally exists between the nature of the substrates of tapes and discs. "Substrate" refers to the member which carries the magnetic tracks.

In the case of tape, the substrate is generally an electrically insulating strip which is thin (typically of the order of 5 $\mu$m), especially in its particular use for high densities, as in data processing for example. In this way, a magnetic head whose two pole-pieces are arranged on either side of the strip, thus enclosing the strip in its air-gap, is perfectly suitable and adequate to create perpendicular fields properly and easily. Owing to the small thickness of the tape, the air-gap remains of the small dimensions which is conducive to the efficiency of the head and to the definition of the written data. Also, the electrically insulating material which forms the substrate cannot give rise to eddy currents capable of upsetting the desired fields which are handled by the head.

On the other hand, the substrate of a conventional present-day magnetic disc is thick (of the order of 1 to 2 mm), and is made of a non-magnetic conductive material (generally aluminum). Such discs often have data recorded on both faces, so that the width of the air-gap and, in particular, the eddy currents and the fact of recording on both faces give rise to new problems to be solved not present with respect to magnetic tape.

Attempts so far made to solve these problems have not produced a valid solution.

As an example, an attempted solution described by the Japanese S. Iwasaki and Y. Nakamura, in the journal "IEEE Transactions of Magnetics" vol. MAG-13, No. 5, September 1977, pages 1272 to 1277, although original and interesting, is nevertheless restricted to application to tapes, by reason of the fact that the write field still has to pass through the substrate. However, because on the one hand of the anisotropy of the magnetic layer, which is formed by high-frequency sputtering of a chrome-cobalt compound and which is orientated in such a way that the axis of easy magnetization is perpendicular to the plane of the substrate (a thin film of polyimide), and because on the other hand of the special single-pole head (through whose air-gap the carrier passes), the field lines are concentrated in the magnetic layer and thus provide high recording density and good definition. It should however be noted that there are a number of known methods of depositing layers having perpendicular anisotropy and that a large number of compounds are known which can be used to form them, as is described, for example, in French Patent No. 2,179,731.

SUMMARY OF THE INVENTION

The present invention overcomes the disadvantages of previous solutions which have been proposed.

In accordance with the present invention there is provided a carrier for magnetic data recorded therein by perpendicular recording and comprises a non-magnetic substrate having at least one substantially plane surface provided with a magnetic layer for data which is formed by an anisotropic magnetic material having its axis of easy magnetization perpendicular to the said plane surface, and includes an additional layer formed from an anisotropic magnetic material whose axis of hard magnetization is parallel to the said plane surface.

The present invention offers the same advantages whether the layers are applied to a magnetic tape or a magnetic disc. In the case of a disc having a conductive substrate and adapted to have data recorded on both faces, if the additional layer is placed underneath the magnetic layer for data, data can be read and written without the fluxes concerned passing through the substrate. In this way, the read/write heads may be integrated heads whose pole pieces and air-gaps form a magnetic loop circuit situated on one and the same side of the disc.

BRIEF DESCRIPTION OF THE DRAWINGS

The features and advantages of the invention will be more clearly apparent from the following description, which is given with reference to the accompanying drawings.

In the drawings:

FIG. 1A is a perspective view of a region of one embodiment of data carrier according to the invention.

FIG. 1B shows a system of axes to serve as a reference for the axes of magnetization of the magnetic materials involved in the production of the data carrier shown in FIG. 1A.

FIG. 3 is a partial sectional view of a modified embodiment according to the invention of an additional layer which can be used in producing the data carrier of the invention.

DETAILED DESCRIPTION OF THE INVENTION

Figure 2:
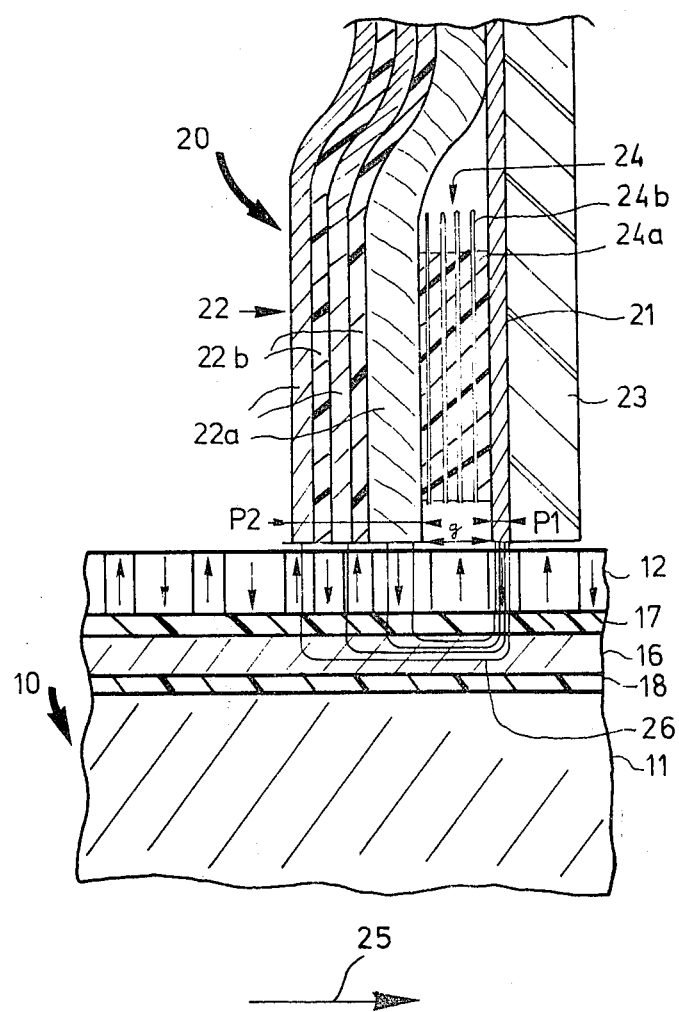
FIG. 2 is a fragmentary sectional view of a region of an embodiment of data carrier according to the invention, cooperating with an integrated read/write head.

The region of a data carrier 10 according to the invention which is illustrated in FIG. 1A includes part of the substrate 11 of the carrier and a fragment 12 of magnetic track which is extended on the side of a plane face 13 of the carrier. The data carrier 10 may be a tape or a magnetic disc. However, in view of the aforenoted problems related to tapes, the description will be given with respect to the preferred embodiment of the invention which utilizes a magnetic disc. Accordingly, it will be assumed in the remainder of the description that the carrier 10 shown in FIG. 1A is a magnetic disc. The system of axes Oxyz in FIG. 1B will be used as a reference for the dimensions of the data carrier. As is generally the case with conventional magnetic discs, the substrate 11 is made of a conductive material such as aluminum or an alloy thereof metal, and its thickness, along axis Oz is of the order of 2 mm.

In the prior art, it is known to deposit a magnetic track 12 directly on face 13 of the substrate 11. Each such track 12 is formed by an anisotropic magnetic layer made up, in the lengthwise direction, i.e., along the Oy axis, of successive cells 14 separated by transitions 15 having a length t along the Oy axis. With the code illustrated in FIG. 1A, an item of 0 data or 0 information is represented by cells whose length along axis Oy is d, and an item of 1 data or 1 information is represented by cells of length 2d. The cells are magnetized perpendicularly to the face surface 13 of the substrate 11 in directions which are opposite in adjoining cells 14, as shown by the vertical arrows of FIG. 1A. This magnetization is advantageously brought about in an anisotropic magnetic material whose axis of easy magnetization $M_f$ is parallel to direction Oz and whose axis of hard magnetization $M_d$ is parallel to direction Ox, as shown in the intermediate vector diagram of FIG. 1B. Since the plane of the axes of magnetization Mf and Md is perpendicular to the plane of face 13 of the substrate 11 (plane Oxy) the magnetic layer 12 is said to have perpendicular anisotropy. It will be recalled that an anisotropic mangetic material is characterized by permeability which varies with the direction of the magnetization in space, the permeability being lowest along the axis of easy magnetization $M_f$ and highest along the axis of hard magnetization $M_d$. It should be apparent that the anisotropy may be either magneto-crystalline or induced. The thickness e of the magnetic layer 12 is generally of the order of 1 μm.

Thus far, the structure as described, has been limited to known prior art. In accordance with the present invention, the data carrier 10 has an additional layer 16 formed from an anisotropic magnetic material whose axis of hard magnetization $M_d$ is parallel to the base surface 13 of substrate 11, as shown in the lower vector diagram of FIG. 1B on a level with layer 16. In the case of the magnetic disc, the layer 16 is advantageously inserted between the magnetic data layer 12 and the substrate 11, as shown in FIG. 1A. Also preferably, the axis of easy magnetization $M_f$ of the layer 16 will be in direction Ox, as shown in FIG. 1B. By reason of the fact that the axes of easy and hard magnetization of the additional layer 16 are parallel to surface 13, the magnetic material forming the additional layer 16 is said to have parallel anisotropy. The material selected preferably is an iron-nickel alloy which may be for example 82% nickel and 18% iron and which exhibits high permeability in direction Oy, but a permeability of virtually unity in the other two directions Ox and Oz.

To ensure that exchanges of energy between the magnetic layers 12 and 16 of different anisotropies are negligible and that the magneto-static coupling energy is considerable, a coupling layer 17 made of a non-magnetic, electrically insulating material is arranged between the two said layers.

It is also necessary to ensure that the additional magnetic layer 16 adheres properly to the material of the substrate 11 which in the preferred embodiment is aluminum, and is responsible for virtually no exchange of energy with the substrate. For this purpose, a sub-layer 18 is formed on the surface 13 of the substrate 11 between the latter and the additional layer 16. The sub-layer 18 is made of a non-magnetic insulating material which ensures good adhesion to the substate 11 while forming a diffusion barrier between the additional layer 16 and the substrate 11.

It should be noted however that an isolating layer 18 such as is used in prior art arrangements for the same reasons and in and of itself forms no inventive feature.

FIG. 2 is a schematic sectional view illustrating an integrated read/write head 20 associated with a data carrier according to the invention as shown in FIG. 1A. An embodiment of the integrated head 20 will be found in a French Pat. No. 2,063,693 entitled "Integrated Magnetic Head and Method of Producing the Said Head" which was filed on Oct. 28, 1969 by "Commissariat a L'Energie Atomique" and "Compagnie Internationale Pour L'Informatique". Reference may also be made to U.S. Pat. No. 3,729,665 and its U.S. Pat. Reissue No. 29,326.

As shown in FIG. 2, the integrated head 20 is a loop head. It is in fact made up of two pole pieces 21, 22 which are situated on the same side of the data carrier 10 and which have an air-gap g close to the carrier. The pole pieces 21, 22 are formed by magnetic layers deposited on a non-magnetic insulating substrate 23. Also, they enclose an electrical winding 24 which is similarly formed from superimposed conductive layers. To be more exact, pole piece 21 is a magnetic layer of thickness $p_1$ which is deposited directly on the substrate 23. The winding 24 is formed on the part of the pole piece 21 adjacent the air-gap g by depositing insulating and conductive layers 24a and 24b. The thickness $p_2$ of pole piece 22 is relatively greater than the thickness $p_1$ of pole piece 21 and pole piece 22 is formed by a stack of layers which are alternatively magnetic (22a), and insulating and non-magnetic (22b).

Data is written on the carrier 10 by causing the carrier to travel in the direction of arrow 25 at a given speed and by passing a current representing the data to be written through the winding 24. This current causes a magnetic flux to be generated in the pole pieces. The flux has a closed path which passes through the magnetic data layer 12 of the carrier 10 as indicated by the magnetic field lines 26. It can thus be seen that the small thickness of the pole piece 21 concentrates the flux as it emerges from the said pole piece. Since the axis of easy magnetization of the data layer 12 of the carrier 10 is vertical and perpendicular to the surface 13 of the substrate 11, the field at the exit from pole piece 21 will be channelled in this direction while maintaining virtually the same concentration. The thickness $p_1$ of pole piece 21 thus determines the length d of the magnetic data cells 14. To be more exact, the thickness $p_1$ should be less than or equal to the length d. The leakage field 26 under the pole piece 21 is thus virtually perpendicular to the plane of layer 12 and saturates the layer in the direction of its axis of easy magnetization into extremely localized cells which are separated in practice by Bloch walls if the thickness of the layer 12 is of the order of a micron.

In the additional magnetic layer 16, the magnetic field 26 follows a direction parallel to the plane of the layer in the direction of its axis of hard magnetization.

Finally, under pole piece 22 the field 26 spreads out through the data layer 12 by reason of the thickness $p_2$, which is relatively greater than thickness $p_1$. This spread makes it possible for the magnetic data layer 12 not to be saturated under pole piece 22 and enables this part of the layer 12 to be written on subsequently under satisfactory conditions. There is thus a distinct advantage in making the value of $p_2$ considerably greater than that of $p_1$, namely at least equal to $2d$.

It should also be noted that the size of the space between the two pole pieces 21 and 22 which is occupied by the winding 24 should be such as to give the magnetic path in the two pole pieces a reluctance value which is low as compared with the leakage reluctance through the winding 24. Also, it should be evident that the thickness of the additional layer 16 should be such that the reluctance for flux closure path between the pole pieces 21, 22 under the layer 12 is very low. This thickness must therefore be considerable. However, the thickness of this layer is restricted by the skin effect which occurs in it as a function of the frequency at which data is written. To remedy this, recourse could be had to the laminated structure described in French Pat. No. 2,063,694 entitled "A Low Reluctance Magnetic Circuit" which was filed on October 28, 1969 by "Commissariat a L'Energie Atomique" and "Compagnie Internationale Pour L'Informatique". Reference may also be made to corresponding U.S. Pat. No. 3,961,299.

A detailed embodiment of an additional layer 16 having a laminated structure is illustrated in the fragmentary section of FIG. 3. In this embodiment, the layer is made up of four thin magnetic layers 16a which have the same anisotropy as is indicated in FIG. 1B and which are separated from one another by insulating layers 16b. The magnetic layers 16a are preferably made of an alloy of iron, nickel and chrome. In this case, permeability along the axis of hard magnetization is of the order of 5,000, while permeability along the other two axes is virtually 1 and thus advantageously ensures that there is no magnetic coupling between layers 12 and 16 in direction Ox. Consequently, all the field components in direction Ox will be small and thus the data cells 14 will be clearly defined.

Once the cell 14 which has just been written has moved away from head 20, there appear on either side of the layer 12 demagnetizing fields which tend to demagnetize the recorded cells. In FIG. 1A the path of the demagnetizing fields in the air above layer 12 are identified by curved lines 19. The path of the opposing demagnetizing fields propagated in the layer 16 are identified by 19'. It should be noted on the one hand that the cell-to-cell coupling in the transitions 15 itself minimizes the overall magnetostatic energy in the system and on the other hand that this energy is reduced still further by the additional layer 16 which, by closing the fields 19' almost completely, reduces the total circulation of the field, as illustrated in FIG. 1A. As a result the leakage fields on the upper surface of the layer 12 are increased to a corresponding degree and make reading that much easier. It should also be noted that the effectiveness of the layer 16 is great only in direction Oy, with the result that the fields in direction Ox, which are interference fields when the track widths are small, are considerably reduced.

The advantages which arise from additional layer 16 may be summed up as follows: the said layer makes it possible to write data on a magnetic disc having a conductive substrate and recorded on both faces; it concentrates the write fields at the same time as it presents to them a very low reluctance, so that the length of the cells 14 may be considerably reduced and thus the density of recording increased; the leakage fields 19 of the cells 14 are increased so that reading is easier and decoding simpler and more reliable; and finally, data can be written and read by a unilateral loop head, that is to say a head whose pole pieces are situated on the same side of the carrier for the purposes of the perpendicular recording to be performed. Also, integrated, very high resolution heads may be efficiently used.

The structure of a carrier according to the invention has been described with respect to magnetic disc memories. The following example gives approximate values in a particular case: a data layer 12 made of an alloy of iron, nickel and chrome with a non-magnetic additive, having a thickness of 0.8 μm. Thickness of layer 17, 0.2 μm. A single additional layer 16 made of an iron-nickel-chrome alloy having a thickness of 0.8 μm, which is effective up to 30 MHz. A length d for the cells substantially equal to 0.5 μm giving a density of 50,000 Bpi (bits per inch), approximately corresponding to 2000 bits per millimeter. A layer 18 of silicon monoxide.

Numerous modifications may be made to the embodiments which have just been described. As previously noted, the additional layer 16 may be applied either to a disc or a tape. In the case of a tape, which has a thin insulating substrate, the layer 16 could be deposited on the opposite face of the substrate from that carrying the data layer 12. The advantages of the additional layer 16 in the case of the tape are of course identical to those which have just been stated above and are thus of greater value than those already achieved by previous solutions. It will of course be readily apparent to those skilled in the art that the nature of the materials mentioned in the course of the description was given by way of example and that the features and true spirit of the invention are present as soon as the anisotropies of the materials 12 and 16 meet the condition stated above and defined in the claims accompanying the specification. In addition, the read head 20 may be of a different type from that described above.

While the invention has been described in connection with several structure embodiments, variations to the embodiments will be readily apparent to those skilled in the art from a reading of the foregoing description, and reference should be made to the appended claims which define the full scope and true spirit of the invention.

I claim:

1. A carrier adapted to have data recorded therein by perpendicular magnetic recording comprising a non-magnetic substrate having at least one plane surface and a plurality of magnetic layers on said substrate, said plurality of layers including a first magnetic data layer of anisotropic magnetic material for recording of data having its axis of easy magnetization perpendicular to the said surface and comprising, in the lengthwise direction, successive magnetic cells separated by transitions and an additional magnetic layer of anisotropic magnetic material having its axis of hard magnetization is parallel to the surface, said additional layer being disposed between the substrate and the said first layer, the plane of anisotropy of the first magnetic data layer being perpendicular to the said surface of the substrate, and the plane of anisotropy of the additional layer being parallel to the said surface such that the axis of hard magnetization of the additional layer is substantially parallel to the lengthwise direction of the data layer.

2. A carrier according to claim 1 including a non-magnetic electrically insulating coupling layer between the magnetic data layer and the additional layer.

3. A carrier according to claim 2 including a sub-layer between the substrate and the additional layer, said sub-layer being a non-magnetic, electrically insulating material for ensuring good adhesion to the substrate while forming a diffusion barrier between the additional layer and the substrate.

4. A carrier according to claim 1 further including a sub-layer between the substrate and the additional layer, said sub-layer being a non-magnetic, electrically insulating material for ensuring good adhesion to the substrate while forming a diffusion barrier between the additional layer and the substrate.

5. A carrier according to claim 1 wherein the additional layer comprises an alternating stack of thin magnetic layers and thin non-magnetic layers, the anisotropy of the thin magnetic layers being parallel to the said surface and said thin magnetic layers being even in number.

6. A carrier according to claim 5 wherein the said thin magnetic layers comprise an alloy of iron, nickel and chrome.

7. A carrier according to claim 6 including a non-magnetic, electrically insulating coupling layer between the magnetic data layer and the additional layer.

8. A carrier according to claim 6 further including a sub-layer between the substrate and the additional layer, said sub-layer being a non-magnetic, electrically insulating material for ensuring good adhesion to the substrate while forming a diffusion barrier between the additional layer and the substrate.

9. A carrier according to claim 1 wherein the said additional layer comprises an alloy of iron, nickel and chrome.

10. A carrier according to claim 9 including a non-magnetic, electrically insulating coupling layer between the magnetic data layer and the additional layer.

11. A carrier according to claim 9 further including a sub-layer between the substrate and the additional layer, said sub-layer being a non-magnetic, electrically insulating material for ensuring good adhesion to the substrate while forming a diffusion barrier between the additional layer and the substrate.

12. A carrier according to claim 11 including an electrically insulating coupling layer between the first layer and the additional layer.

13. A carrier adapted to have data recorded therein by perpendicular magnetic recording comprising a non-magnetic substrate having at least one plane surface and a plurality of magnetic layers on said substrate, said plurality of layers including a first magnetic data layer of anisotropic magnetic material for recording of data having its axis of easy magnetization perpendicular to the said surface and an additional magnetic layer of anisotripic magnetic material having its axis of hard magnetization is parallel to the said surface, said additional layer comprising an alternating stack of thin magnetic layers and thin non-magnetic layers, the anisotropy of the thin magnetic layers being parallel to the said surface and said thin magnetic layers being even in number.

14. A carrier according to claim 13 wherein the said additional layer is disposed between the substrate and the said first layer.

15. A carrier according to claim 13 or 14 wherein the plane of anisotropy of the magnetic data layer is perpendicular to the said surface of the substrate, and the plae of anisotrophy of the additional layer is parallel to the said surface, the axis of hard magnetization being substantially parallel to the lengthwise direction of the data layer.

16. A carrier according to claim 13 wherein the said thin magnetic layers comprise an alloy of iron, nickel and chrome.

17. A carrier adapted to have data recorded therein by perpendicular magnetic recording comprising a non-magnetic substrate having at least one plane surface and a plurality of magnetic layers on said substrate, said plurality of layers including a first magnetic data layer of anisotropic magnetic material for recording data, said first layer having perpendicular anisotropy and its axis of easy magnetization perpendicular to the said surface and an additional magnetic layer of anisotropic magnetic material, said additional layer having parallel anisotropy and its axis of hard magnetization parallel to the said surface, said additional layer being disposed between the substrate and the said first layer and comprising an alternating stack of thin magnetic layers being parallel to the said surface and said thin magnetic layers being even in number.

18. A carrier according to claim 17 wherein the said thin magnetic layers comprise an alloy of iron, nickel and chrome.

19. A carrier according to claim 18 including a non-magnetic, electrically insulating coupling layer between the first layer and the additional layer.

* * * * *